United States Patent [19]
Forster

[11] Patent Number: 5,354,180
[45] Date of Patent: Oct. 11, 1994

[54] HYDROSTATIC ASSEMBLY HAVING MULTIPLE PUMPS

[75] Inventor: Franz Forster, Karlstadt-Muhlbach, Fed. Rep. of Germany

[73] Assignee: Linde Aktiengesellschaft, Fed. Rep. of Germany

[21] Appl. No.: 89,790

[22] Filed: Jul. 9, 1993

[30] Foreign Application Priority Data

Jul. 31, 1992 [DE] Fed. Rep. of Germany ....... 4225380

[51] Int. Cl.$^5$ .......................... F04B 1/12; F04B 23/08
[52] U.S. Cl. .................... 417/199.1; 417/269
[58] Field of Search ...................... 417/269, 276, 199.1

[56] References Cited

U.S. PATENT DOCUMENTS

| | | | |
|---|---|---|---|
| 2,715,875 | 8/1955 | Towler et al. | 417/269 |
| 3,046,907 | 7/1962 | Pechunder | 417/269 X |
| 3,904,318 | 9/1975 | Born et al. | 417/199.1 |
| 4,105,369 | 8/1978 | McClocklin | 417/269 X |

OTHER PUBLICATIONS

Linde, The Energy Dimension, Apr. 1986.

*Primary Examiner*—Richard E. Gluck
*Attorney, Agent, or Firm*—Webb Ziesenheim Bruening Logsdon Orkin & Hanson

[57] ABSTRACT

A hydrostatic assembly including a primary pump formed by a swash plate type axial piston engine and at least one coaxial secondary pump formed by a swash plate type axial piston engine. An elongated input shaft extends through the primary pump and is non-rotatably connected to the cylindrical drum of the primary pump. A control base is axially aligned with the cylindrical drum of the primary pump and forms a control surface opposite the closed end of the cylindrical drum of the primary pump. A recess is formed in the control base and the secondary pump is at least partially located in the recess and is non-rotatably connected to the elongated input shaft so that the secondary pump drives the primary pump.

18 Claims, 3 Drawing Sheets

HYDROSTATIC ASSEMBLY HAVING MULTIPLE PUMPS

BACKGROUND OF THE INVENTION

1. Field of the Invention

The invention relates generally to a hydrostatic assembly having a primary pump and at least one secondary pump wherein the primary pump is a swash plate type axial piston motor having a cylindrical drum connected to an input shaft for rotation therewith and the closed end of the cylindrical drum is located adjacent to a control surface which is formed integrally with a control base or is a separate element attached to the control base. The secondary pump drives the primary pump by means of the input shaft.

2. Description of the Prior Art

This type of hydrostatic assembly generally includes standard individual pumps, such as an axial piston motor which operates as the primary pump and a gear pump which operates as the secondary pump. However, there are arrangements wherein two axial piston motors are connected. These assemblies are usually used to drive working machines, such as construction machines. The prior art also discloses the integration of a generic assembly with hydrostatic swash plate type axial piston motors having additional components in order to form a compact axle.

In addition to the structural length resulting from lining up individual conventional modules, a disadvantage of the prior art assemblies is the cost of the large number of components and of the installation. This is particularly true if the secondary pump is an axial piston motor.

SUMMARY OF THE INVENTION

The objects of the invention are to provide a high-capacity hydrostatic assembly with a relatively small size, particularly the length, and a relatively small number of components.

These objects are achieved because the secondary pump is an axial piston motor having a cylindrical drum supported by and connected to the elongated input shaft of the primary pump. The hydrostatic assembly designed in this manner is powerful, even though it is small and it contains relatively few components. The input shaft of the primary pump performs all of the functions of an input shaft of the secondary pump, namely transmission of torque and cylindrical drum support. As a result, the secondary pump does not require a separate input shaft. It is, however, necessary to make the input shaft of the primary pump sufficiently long so that the cylindrical drum of the secondary pump can rest on the shaft. The mounting points in the primary pump absorb the bearing forces of the secondary pump. The roller bearings required to support a separate input shaft in the secondary pumps of the prior art are therefore eliminated. Thus, the hydrostatic assembly according to the invention is shorter than an assembly of the prior art. The input shaft can also be provided in two parts so that the cylindrical drum of the secondary pump rests on an extension shaft connected to the input shaft of the primary pump.

In a refinement of the invention, the control base of the primary pump functions as the swash plate seat of the secondary pump. This construction eliminates another component.

It is advantageous if at least a part of the housing of the secondary pump is formed by the walls of a recess formed in the control base of the primary pump into which the input shaft of the primary pump extends. The secondary pump is thus located at least partly within the control base of the primary pump. If the cylindrical drum of the secondary pump is located completely within the recess in the control base of the primary pump, the open end of the recess is closed by a cover onto which the control surface of the secondary pump is cast. Thus, in addition to functioning as a swash plate seat, the control base of the primary pump also functions as the housing for the secondary pump so that the secondary pump does not require a separate housing. Since the control base of the primary pump functions as two parts of the secondary pump, the length of the hydrostatic assembly is reduced and less components are required.

According to another embodiment of the invention, at least one part of the housing of the secondary pump is formed by the pot-shaped control base of the secondary pump. In this case, the control base of the primary pump serves as the swash plate seat of the secondary pump and the control base of the secondary pump serves as the housing of the secondary pump. As with the embodiment described above, in which the housing of the secondary pump is formed by the control base of the primary pump, a separate secondary pump housing and swash plate seat can be eliminated.

If a constant volume displacement pump is used as the secondary pump, it is particularly advantageous if the swash plate of the secondary pump is cast on the control base of the primary pump. This eliminates an additional part. If the displacement of the secondary pump is variable, a swash plate is pivotally mounted on the control base or in the recess of the control base of the primary pump, and a correspondingly modified pivot mechanism is installed. A variable secondary pump makes it possible to improve the match of shaft power to the actual drive power, in particular in the lower speed range.

In applications in which more hydraulic consumers must be supplied than the secondary pump can handle, a refinement of the invention includes a second secondary pump located on the side of the control base opposite the primary pump. The second secondary pump is connected on the input side to the input shaft of the primary pump or to a coupled, coaxial intermediate shaft. In order to use the fewest possible number of components, the second secondary pump is either a gear pump or an annular gear pump, with the housing on the end facing the first secondary pump closed by a cover which serves as the control base of the first secondary pump.

A particularly advantageous application of a hydrostatic assembly according to the invention is in the drive system of a vehicle such as a work machine. The vehicle has a live axle with two coaxial swash plate type axial piston motors and each of which has an end connected to the axle. The control surfaces of the motors are perpendicular to the control surface of the primary pump and are located on the control base of the primary pump, which control base, therefore, functions as a distributor block.

It is also advantageous to use a hydrostatic assembly according to the invention to drive an industrial truck with a hydrostatic transmission. In this arrangement the primary pump is the high-pressure pump for the traveling mechanism; the first secondary pump is the medium-pressure pump for the working hydraulics; and the second secondary pump is the low-pressure pump for auxiliaries. The high-pressure primary pump thus serves as the traveling mechanism pump for the hydrostatic transmission. The medium-pressure first secondary pump is used as the working pump to supply the lifting and handling hydraulics. The low-pressure second secondary pump which can be considered to be an auxiliary pump is responsible for supplying secondary hydraulic consumers, such as the steering mechanism, and for maintaining a feed pressure in the closed circuit of the hydrostatic transmission.

A complete understanding of the invention will be obtained from the following description when taken in connection with the accompanying drawings wherein like reference characters identify like parts throughout.

DESCRIPTION OF THE PREFERRED EMBODIMENTS

Figure 2:
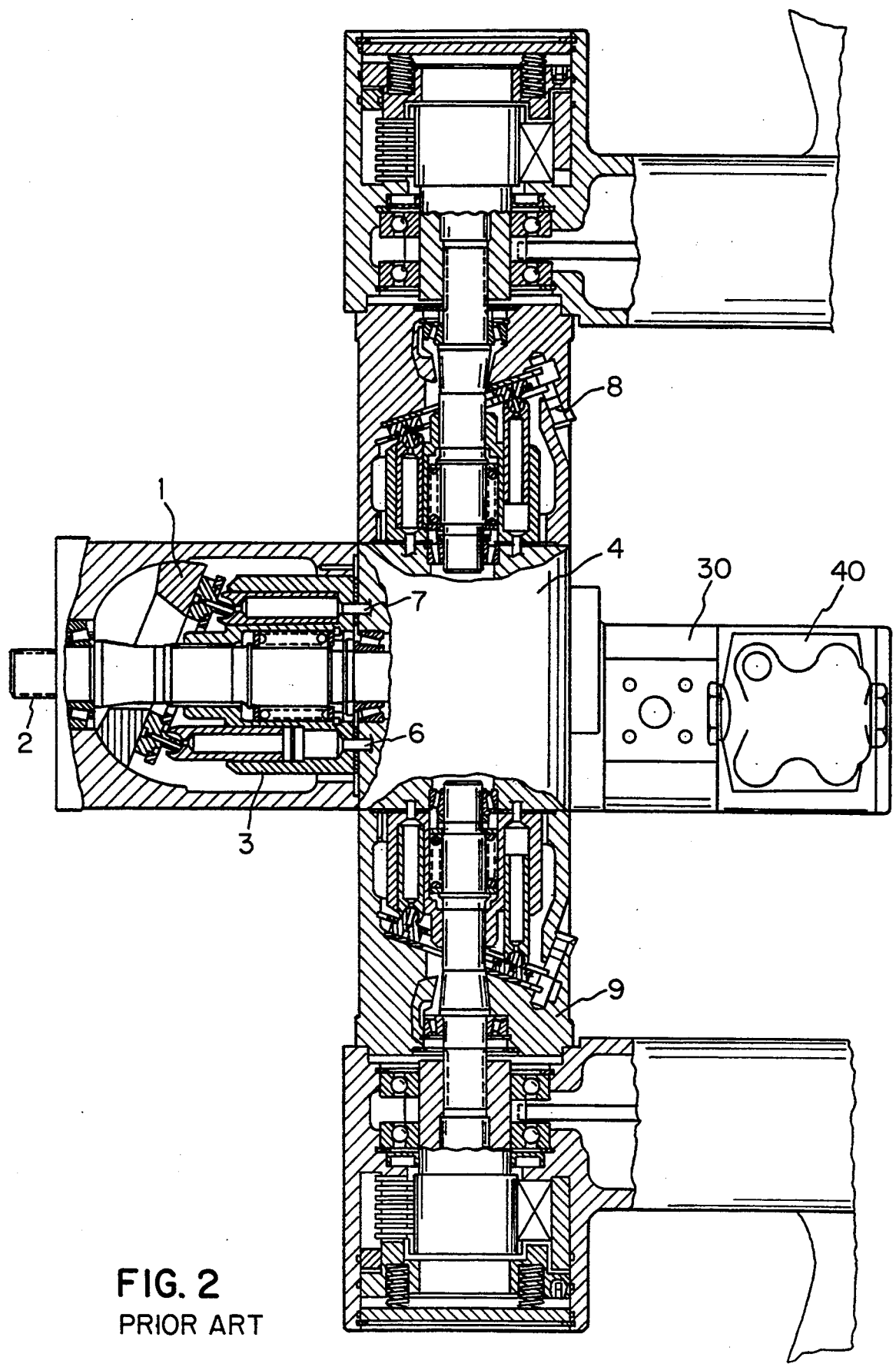
FIG. 2 is a partial section through a hydrostatic assembly and a prior art live axle.

A hydrostatic assembly shown in the drawings is installed in a live axle and a section through the center portion of such an axle is shown in FIG. 2 of the drawings. For example, a hydrostatic assembly can be installed in the live axle of an industrial truck such as a counterbalance forklift with a compact hydrostatic transmission as distinguished from a dispersed design. The live axle of the prior art which is shown in FIG. 2 of the drawings is a "compact axle".

The hydrostatic assembly shown in FIG. 2 of the drawings includes a primary pump 1 having a central input shaft 2 and a cylindrical drum 3 connected to the input shaft. One end of cylindrical drum 3 rests against a control base 4 and a control plate 5 having a control surface is located between the face of the cylindrical drum and the control base. The control surface is formed with kidney-shaped control slots as is well-known to those skilled in the art. The control surface can also be cast directly on control base 4, in which case, the kidney-shaped control slots are formed directly in the control base.

The control slots are in fluid communication with a hydraulic-medium supply channel 6 and a hydraulic-medium discharge channel 7 which are formed in control base 4. Control base 4 is cuboid and, in addition to serving as the seat for the swash plate of primary pump 1, serves as a distributor which directs the flow of hydraulic medium from primary pump 1 to the control surfaces of two coaxially oriented swash plate type axial piston motors 8 and 9, each of which is connected to a wheel drive on the end of the axle. Thus, the control surfaces of motors 8 and 9 are located on control base 4 and are perpendicular to the control surface of primary pump 1 which is also on control base 4. As with the control surface of primary pump 1, the control surfaces of motors 8 and 9 can either be cast directly on control base 4 or formed by separate members located between control base 4 and motors 8 and 9. Control base 4 can, therefore, also be designated as a distributor block. Primary pump 1 and swash plate type axial piston motors 8 and 9 work as a hydrostatic transmission under high pressure in a closed circuit and constitute the middle portion of the traveling mechanism of an industrial truck. The assembly described hereinabove is known in the prior art.

As shown in FIG. 2 of the drawings, two secondary pumps 30 and 40 are connected to the side of distributor block or control base 4 opposite primary pump 1. The secondary pumps are driven by input shaft 2 which extends completely through control base 4 or by a coaxial intermediate shaft mounted in the control base and connected to input shaft 2. Secondary pumps 30 and 40 supply the working hydraulics and the additional consumers on the vehicle. The secondary pump which supplies the working hydraulics of the vehicle and operates in the medium-pressure range and the other secondary pump operates in the low-pressure range. In addition to the relatively large expense for components, the prior art arrangement shown in FIG. 2 of the drawings is disadvantageous because of the relatively substantial length of the hydrostatic pump assembly.

Figure 1:
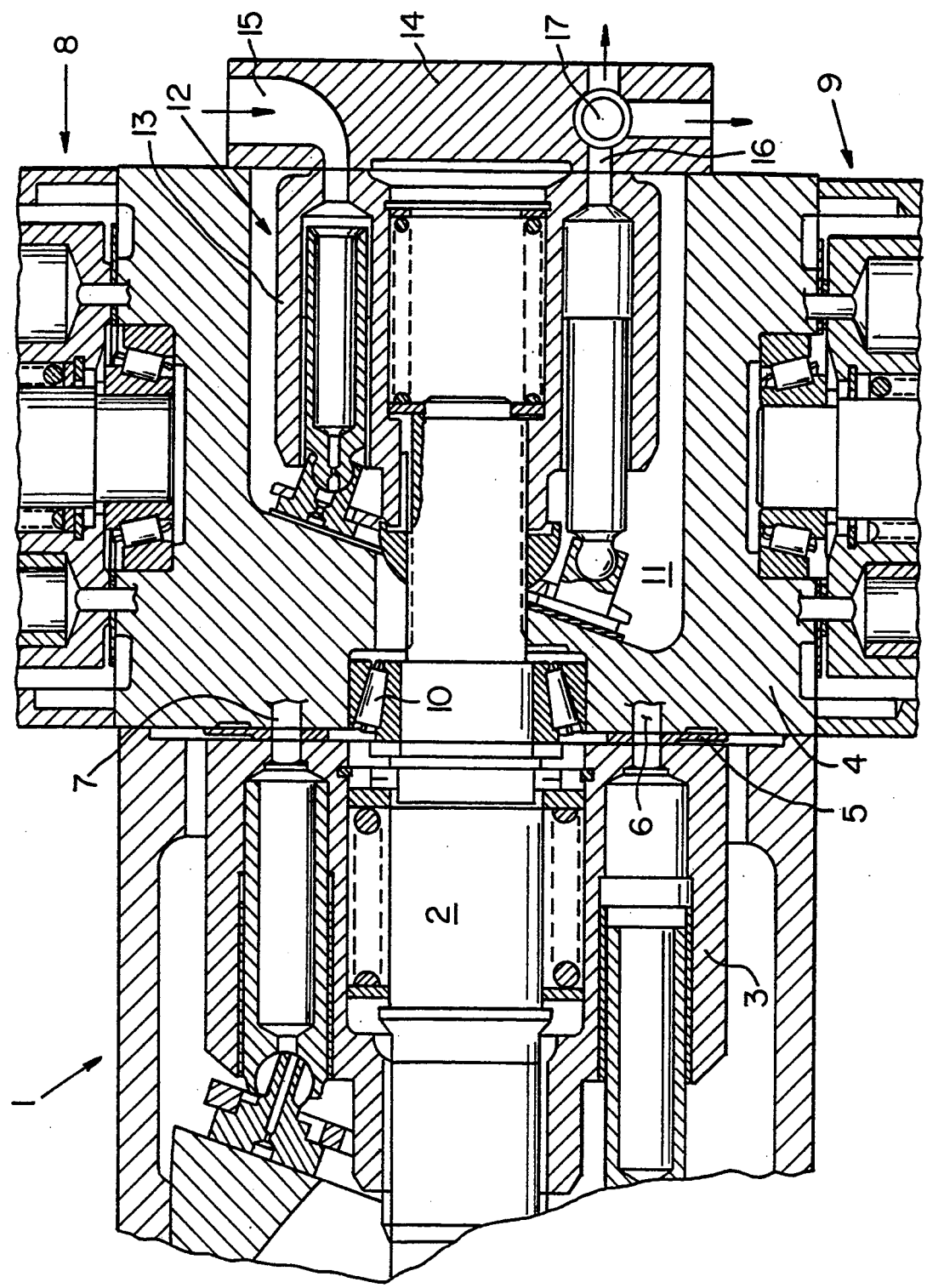
FIG. 1 is a longitudinal section through a hydrostatic assembly according to the invention installed in a live axle.

In the hydrostatic assembly shown in FIG. 1 of the drawings, input shaft 2 is mounted in a roller bearing 10 located adjacent the end of control base 4 and extends beyond roller bearing 10 into a recess 11 which is formed in control base 4. A swash plate type axial piston secondary pump 12 is shown as completely contained in recess 11 although it can also be only partially contained in the recess. Recess 11 can be formed in control base 4 by drilling or by casting, if control base 4 is cast.

Secondary pump 12 operates in the medium-pressure range and is primarily used to operate the working hydraulics of an industrial truck, such as the lifting hydraulics. The walls of recess 11 in control base 4 form the housing of secondary pump 12 and a cylindrical drum 13 is located within recess 11. Cylindrical drum 13 is supported on that part of elongated input shaft 2 of primary pump 1 which extends into recess 11.

The secondary pump has a constant displacement in the embodiment of the invention shown in FIG. 1 of the drawings and, therefore, the swash plate can be directly cast as a part of control base 4 within recess 11. The open end of recess 11 opposite the swash plate is closed by a cover 14. The face of cover 14 opposite the swash plate formed on control base 4 functions as the control surface of secondary pump 12 and is formed with a hydraulic-medium supply channel 15 and a hydraulic-medium discharge channel 16.

The flow from secondary pump 12 is allocated by a flow meter (not shown) which is located in a passage 17 in cover 14 downstream of hydraulic-medium discharge channel 16. A portion of the flow from discharge channel 16 is directed to the hydrostatic circuit of the traveling mechanism to maintain a minimum pressure therein and the other portion of the flow from discharge channel 16 is directed to the working hydraulics of the vehicle.

In contrast to a conventional hydrostatic pump assembly consisting of a primary pump and a secondary pump, the assembly according to the invention contains significantly fewer components. In this regard, a separate input shaft for the secondary pump has been eliminated, along with the bearings for the separate input shaft. A separate housing for the secondary pump has also been eliminated. Additionally, the length of the assembly has been reduced because the control base of the primary pump also functions as the swash plate of the secondary pump.

Figure 3:
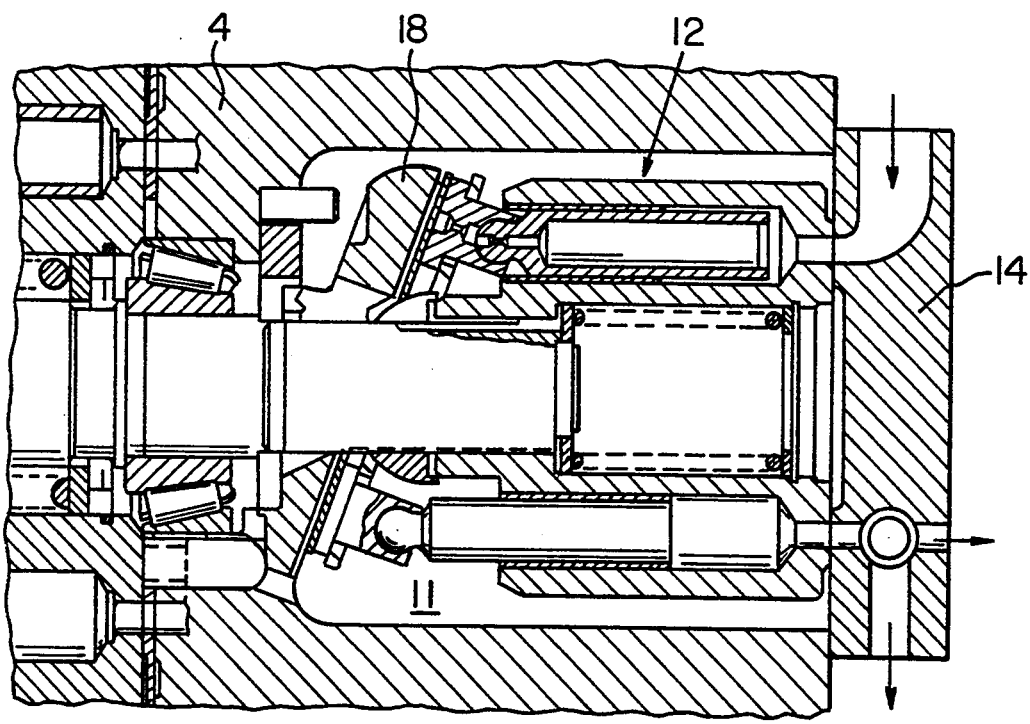
FIG. 3 is a longitudinal section through a second embodiment of the hydrostatic assembly.

In the embodiment shown in FIG. 3 of the drawings, a variable displacement secondary pump is used in place of a constant displacement secondary pump. In order to accommodate the variable displacement secondary pump, the longitudinal dimension or depth of recess 11 in control base 4 is greater than in the embodiment of FIG. 1 of the drawings in order to provide sufficient room for adjustable swash plate 18 and the adjustment mechanism therefor (not shown).

Figure 4:
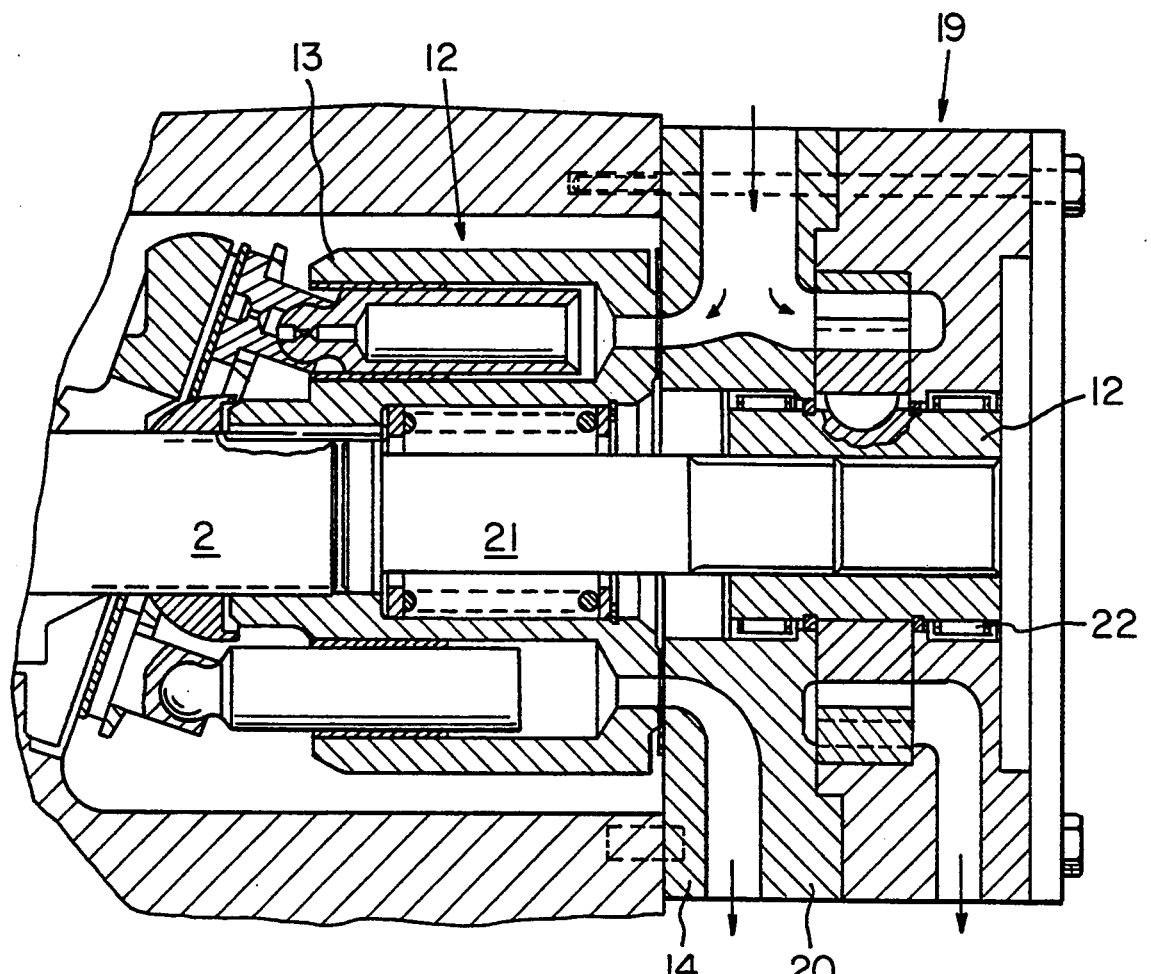
FIG. 4 is a longitudinal section through another embodiment of the hydrostatic assembly.

The embodiment shown in FIG. 4 of the drawings is used when the required output of secondary pump 12, the work pump, is so large that it is not advantageous to branch the flow from the work pump. Instead, auxiliary streams are created by a separate secondary pump 19, such as a gear pump or an annular gear pump. The secondary pump shown in FIG. 4 is an annular gear pump having a housing 20 with the face toward the first secondary pump 12, the medium-pressure pump, closed by cover 14 which has a surface forming the control surface of the first secondary pump. Thus, cover 14 forms the control base of the first medium-pressure secondary pump 12 which is the work pump and a terminal face of the second low-pressure secondary pump 19 which is an annular gear pump.

The drive of annular gear pump 19 is an intermediate shaft 21 which is coupled by a V-toothed gear system of cylindrical drum 13 of secondary pump 12 to input shaft 2 of primary pump 1. Intermediate shaft 21 requires no additional bearings since it is supported on the left side as shown in FIG. 4 of the drawings by cylindrical drum 13 of secondary pump 12, and thus by roller bearing 10 of input shaft 2 of primary pump 1 and on the right side as shown in FIG. 4 of the drawings, by a bearing 22 in second secondary pump 19.

It is possible to use pumps other than a gear pump or an annular gear pump as the second secondary pump. In addition, step-up or step-down gears can be located between the pumps for speed regulation.

The foregoing describes preferred embodiments of the invention and is given by way of example only. The invention is not limited to any of the specific features described herein, but includes all such variations thereof within the scope of the appended claims.

I claim:

1. A hydrostatic assembly including a primary pump formed by a swash plate type axial piston motor having a cylindrical drum with a substantially closed end and at least one coaxial secondary pump formed by a swash plate type axial piston motor having a cylindrical drum, an elongated input shaft extending through said cylindrical drum of said primary pump and connected to said cylindrical drum of said primary pump, a control base axially aligned with said cylindrical drum of said primary pump and having a control surface opposite said substantially closed end of said cylindrical drum of said primary pump, a recess formed in said control base by an end wall and an annular wall and having an open end, means for closing said open end of said recess, and said cylindrical drum of said secondary pump connected to said elongated input shaft, whereby said input shaft drives said primary pump and said secondary pump.

2. A hydrostatic assembly as set forth in claim 1 wherein said control surface is cast on said control base.

3. A hydrostatic assembly as set forth in claim 1 including a member attached to said control base forming said control surface on said control base.

4. A hydrostatic assembly as set forth in claim 1 including a swash plate seat for said secondary pump formed on said control base.

5. A hydrostatic assembly as set forth in claim 4 wherein said walls of said recess in said control base form a housing for said secondary pump and wherein said elongated input shaft extends into said recess in said control base.

6. A hydrostatic assembly as set forth in claim 5 wherein said cylindrical drum of said secondary pump is located within said recess in said control base, and a surface of said means for closing said open end of said recess forms a control surface of said secondary pump.

7. A hydrostatic assembly as set forth in claim 6 wherein said control surface of said secondary pump is cast on said means for closing said open end of said recess.

8. A hydrostatic assembly as set forth in claim 4 wherein said control base forms at least part of the housing of said secondary pump.

9. A hydrostatic assembly as set forth in claim 4 wherein said secondary pump has a constant displacement and said swash plate of said secondary pump is cast on said control base.

10. A hydrostatic assembly as set forth in claim 5 wherein said secondary pump has a constant displacement and said swash plate of said secondary pump is cast on said control base.

11. A hydrostatic assembly as set forth in claim 6 wherein said secondary pump has a constant displacement and said swash plate of said secondary pump is cast on said control base.

12. A hydrostatic assembly as set forth in claim 8 wherein said secondary pump has a constant displacement and said swash plate of said secondary pump is cast on said control base.

13. A hydrostatic assembly as set forth in claim 4 including a second secondary pump located on the side of said control base opposite said primary pump and coaxial with said primary pump wherein the input side of said second secondary pump is connected to said elongated input shaft.

14. A hydrostatic assembly as set forth in claim 5 including a second secondary pump located on the side of said control base opposite said primary pump and coaxial with said primary pump wherein the input side of said second secondary pump is connected to said elongated input shaft.

15. A hydrostatic assembly as set forth in claim 6 including a second secondary pump located on the side of said control base opposite said primary pump and coaxial with said primary pump wherein the input side of said second secondary pump is connected to said elongated input shaft.

16. A hydrostatic assembly as set forth in claim 8 including a second secondary pump located on the side of said control base opposite said primary pump and coaxial with said primary pump wherein the input side of said second secondary pump is connected to a coaxial intermediate shaft coupled to said elongated input shaft.

17. A hydrostatic assembly as set forth in claim 9 including a second secondary pump located on the side of said control base opposite said primary pump and coaxial with said primary pump wherein the input side of said second secondary pump is connected to a coaxial intermediate shaft coupled to said elongated input shaft.

18. A hydrostatic assembly as set forth in claim 13 wherein said second secondary pump is a gear pump having a housing closed on the end facing said first secondary pump by said means for closing said open end of said recess and a control surface of said first secondary pump formed on said means for closing said open end of said recess.

* * * * *